PRENTISS & PARSONS.
Apparatus for Purifying and Deoderizing Liquors.
No. 56,797. Patented July 31, 1866.
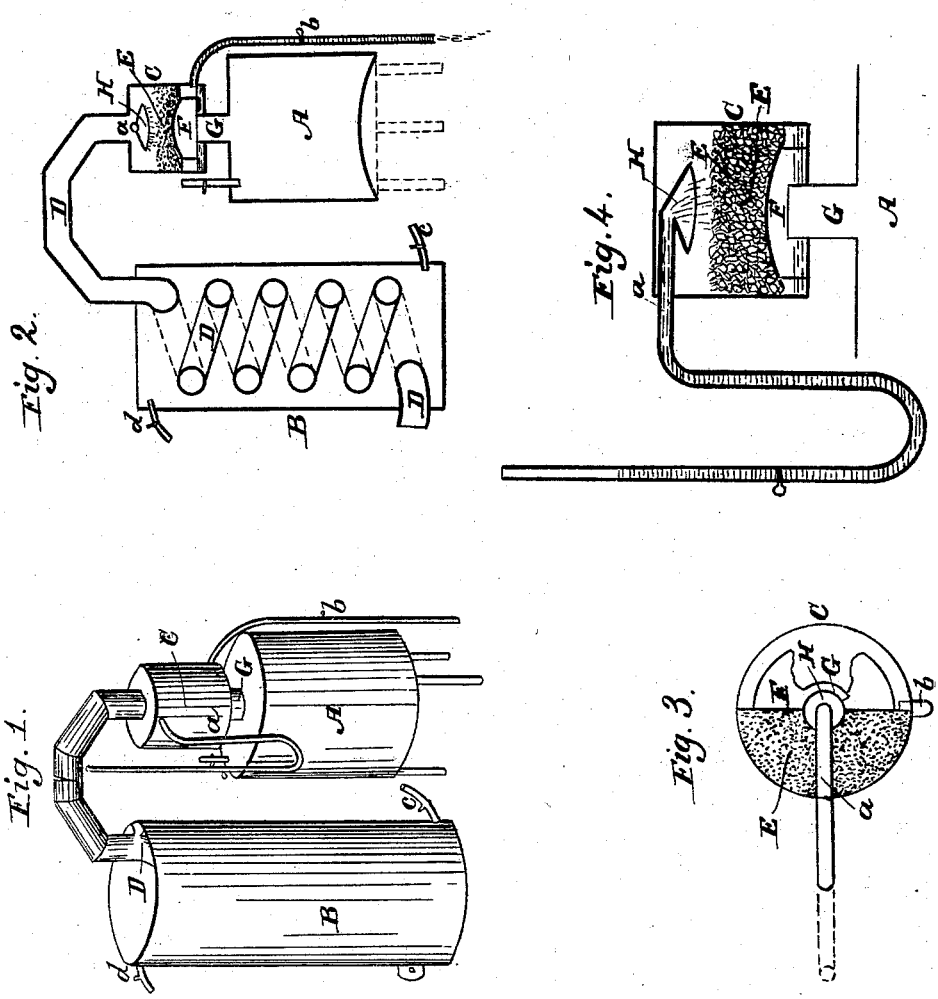

UNITED STATES PATENT OFFICE.

E. F. PRENTISS, OF PHILADELPHIA, PENNSYLVANIA, AND C. C. PARSONS, OF BOSTON, MASSACHUSETTS.

IMPROVED APPARATUS FOR PURIFYING AND DEODORIZING WHISKY, &c.

Specification forming part of Letters Patent No. 56,797, dated July 31, 1866.

*To all whom it may concern:*

Be it known that we, E. FREEMAN PRENTISS, of the city of Philadelphia and State of Pennsylvania, and C. CHAUNCY PARSONS, of the city of Boston and State of Massachusetts, have invented a new and useful Improvement in Apparatus for Purifying and Deodorizing Whisky and other Alcoholic Liquids; and we hereby declare that the following is a full, clear, and exact description of the construction and operation of the same, reference being had to the annexed drawings, forming part hereof, and to the letters of reference marked thereon.

Our improved apparatus is intended to be used in carrying out the process for purifying and deodorizing whisky and other alcoholic liquids for which the said E. F. Prentiss and one Robert Adam Robertson have made application for Letters Patent concurrently herewith.

Our improvement consists, first, of apparatus so constructed that by it the aforesaid process can be more readily carried out in connection with an ordinary still; second, in a more simple and effectual device for distributing the purifying agent over the neutral materials; third, in a device whereby the spent purifying agent and the impurities removed from the alcoholic vapor can, if desired, be carried off, instead of being run into the wash.

In the drawings, Figure 1 is a perspective view of our improvement applied to an ordinary still. Fig. 2 is a vertical section of the same. Fig. 3 is a longitudinal section through the case C. Fig. 4 is a vertical section, on an enlarged scale, of the case C and some of its appurtenant parts.

In the drawings, A is an ordinary still. B is the tank containing the condensing-worm D. C is the case containing the purifying apparatus, and E is the neutral material described in the specification filed with the aforesaid application, through which material the alcoholic vapor passes in its course from the still A to the condenser B.

F is a shield placed over the pipe G, as shown. It supports the neutral material and, together with the pipe $b$ and that part of the pipe G which projects above the bottom of the case C, prevents the neutral material and the purifying agent from getting into the still.

G is a pipe coming from the still A and extending a short distance above the bottom of the case C.

H is a distributer attached to the pipe $a$. The bottom of this distributer is perforated with numerous small holes for distributing over the top of the neutral material E the purifying solution, which is introduced in regulated amount through the trap-tube $a$.

$b$ is a tube attached to the lower part of the case C, for carrying off the spent purifying agent and the impurities taken out of the alcoholic vapors.

The operation of our apparatus is as follows: The alcoholic vapor formed in the still A rises in the pipe G, strikes the under side of the shield F, passes around its edge, up through the interstices of the neutral material E, and in its passage through this material is exposed to the action of the purifying agent. The purified vapor then passes into the pipe D, where it is finally condensed.

The purifying solution (colored brown in the drawings) is introduced through the trap-tube $a$ in quantities regulated by the stop-cock, (shown in the drawings,) and is then distributed over the neutral material by the perforated plate of the distributer H. It passes downward through the neutral material E, carrying with it the impurities removed from the alcoholic vapor, and in a spent state is drawn off, together with the impurities, from the bottom of the case C by the pipe $b$; or, if desired, by closing the stop-cock in tube $b$, the spent agent and the impurities may be caused to run into still A through pipe G.

The case C, obviously, may be made cylindrical, square, oblong, or of any other desired shape.

Having thus described our invention, what we claim, and desire to secure by Letters Patent, is—

1. The distributer H, constructed and arranged in the manner and for the purpose substantially as shown and described.

2. The shield F, constructed and arranged in the manner and for the purpose substantially as shown and described.

3. The pipe b, arranged and operating in the manner and for the purpose substantially as shown and described.

4. The trap-tube a, provided with a distributer, H, and the case C, containing neutral materials, in combination with the shield F and the pipe b, or their equivalents, respectively, substantially as described, the whole to be used in connection with a still.

E. FREEMAN PRENTISS.
C. CHAUNCY PARSONS.

Witnesses:
J. E. SHAW,
JOHN LATHROP.